United States Patent
Suh et al.

(10) Patent No.: US 8,940,179 B2
(45) Date of Patent: Jan. 27, 2015

(54) METHOD FOR PREPARING MAGNETITE NANOPARTICLES FROM LOW-GRADE IRON ORE USING SOLVENT EXTRACTION AND MAGNETITE NANOPARTICLES PREPARED BY THE SAME

(71) Applicant: Korea Institute of Geoscience and Mineral Resources, Daejeon (KR)

(72) Inventors: Yong Jae Suh, Daejeon (KR); Dae Sup Kil, Daejeon (KR); Hee Dong Jang, Daejeon (KR)

(73) Assignee: Korea Institute of Geoscience and Mineral Resources, Deajeon (KR)

( * ) Notice: Subject to any disclaimer, the term of this patent is extended or adjusted under 35 U.S.C. 154(b) by 0 days.

(21) Appl. No.: 13/679,288

(22) Filed: Nov. 16, 2012

(65) Prior Publication Data

US 2014/0124698 A1    May 8, 2014

(30) Foreign Application Priority Data

Nov. 5, 2012    (KR) .......................... 10-2012-0124109

(51) Int. Cl.
 *C01G 49/08*    (2006.01)
 *B22F 1/00*    (2006.01)
 (Continued)

(52) U.S. Cl.
 CPC .............. *C01G 49/08* (2013.01); *B22F 1/0018* (2013.01); *H01F 1/0045* (2013.01);
 (Continued)

(58) Field of Classification Search
 USPC ................ 252/62.56; 106/456; 423/632, 142; 911/811
 See application file for complete search history.

(56) References Cited

U.S. PATENT DOCUMENTS 8,337,805 B1 *  12/2012  Suh et al. ...................... 423/632

FOREIGN PATENT DOCUMENTS

| KR | 10-0442541 B1 | 3/2003 |
| KR | 10-0905403 B1 | 4/2009 |
| KR | 10-1109682 B1 | 2/2012 |

OTHER PUBLICATIONS

De Vicente et al., "On the use of magnetic nano and microparticles for lake restoration", J. Hazard. Mater., vol. 181, pp. 375-381 (2010).

(Continued)

*Primary Examiner* — Carol M Koslow
(74) *Attorney, Agent, or Firm* — Bret E. Field; Bozicevic, Field & Francis LLP

(57) ABSTRACT

The present invention relates to a method for preparing magnetite nanoparticles from low-grade iron ore using solvent extraction and magnetite nanoparticles prepared by the same. According to the method for magnetite nanoparticles from low-grade iron ore of the present invention, it is possible to prepare high-purity magnetite nanoparticles having a purity of 99% or higher by solvent extraction using low-grade iron ore as a starting material, and thus it is possible to reduce the processing cost and the amount of energy used, thus supplying a high-efficiency magnetite nanoparticle adsorbent, which can be industrially applied to wastewater treatment or desalination plant, in large quantities at low cost. In particular, it is possible to effectively treat livestock wastewater, heavy metal wastewater, oil discharged into rivers, etc. at low cost, thus significantly contributing to the prevention of environmental pollution. Moreover, the magnetite nanoparticles prepared by the present invention has a purity of 99.5% and thus can be used as raw materials for high-tech products such as nanoparticle catalysts, magnetic fluids, MRI contrast agents, etc.

12 Claims, 4 Drawing Sheets

(51) Int. Cl.
    H01F 1/00      (2006.01)
    C01G 49/00     (2006.01)
    H01F 1/34      (2006.01)
(52) U.S. Cl.
    CPC ........... *C01G 49/0009* (2013.01); *H01F 1/344* (2013.01); *C01P 2002/72* (2013.01); *C01P 2004/04* (2013.01); *C01P 2004/64* (2013.01); *C01P 2006/42* (2013.01); *C01P 2006/80* (2013.01); *Y10S 977/811* (2013.01)
    USPC ........ 252/62.59; 106/456; 423/632; 423/142; 977/811

(56) References Cited

OTHER PUBLICATIONS

Iwasaki et al., "Size control of magnetite nanoparticles by organic solvent-free chemical coprecipitation at room temperature", J. Exp. Nanosci., vol. 5, No. 3, pp. 251-262 (2010).

Ling et al., "Highly water-soluble magnetic nanoparticles as novel draw solutes in forward osmosis for water reuse", Ind. Eng. Chem. Res., vol. 49, pp. 5869-5876 (2010).

Lu et al., Magnetic nanoparticles: Synthesis, protection, functionalization, and application, Angew. Chem. Int. Ed., vol. 46, pp. 1222-1244 (2007).

Massart, Preparation of aqueous magnetic liquids in alkaline and acidic media, IEEE Trans. Magnetics, vol. MAG-17, No. 2, pp. 1247-1248 (1981).

Shipley et al., "Adsorption of arsenic to magnetite nanoparticles: Effect of particle concentration, pH, ionic strength, and temperature", Environ. Toxicol. Chem., vol. 28, No. 3, pp. 509-515 (2009).

Yuan et al., "Removal of hexavalent chromium [Cr(VI)] from aqueous solutions by the diatomite-supported/unsupported magnetite nanoparticles", J. Hazard. Mater., vol. 173, pp. 614-621 (2010).

\* cited by examiner

METHOD FOR PREPARING MAGNETITE NANOPARTICLES FROM LOW-GRADE IRON ORE USING SOLVENT EXTRACTION AND MAGNETITE NANOPARTICLES PREPARED BY THE SAME

CROSS-REFERENCE TO RELATED APPLICATION

This application claims priority to and the benefit of Korean Patent Application No. 10-2012-124109, filed on Nov. 5, 2012, the disclosure of which is incorporated herein by reference in its entirety.

BACKGROUND

1. Field of the Invention

The present invention relates to a method for preparing magnetite nanoparticles from low-grade iron ore using solvent extraction and magnetite nanoparticles prepared by the same.

2. Discussion of Related Art

Magnetite ($Fe_3O_4$) nanoparticles are suitable as a heavy metal adsorbent in wastewater treatment due to high heavy metal adsorption capacity, can be easily recovered after use due to excellent magnetic properties (Shipley, H. J., Yean, S., Kan, A. T., Tomson, M. B., Adsorption of arsenic to magnetite nanoparticles: Effect of particle concentration, pH, ionic strength, and temperature, Environ. Toxicol. Chem., 28, 509-15 (2009); de Vicente, I., Merino-Martos, A., Cruz-Pizarro, L., de Vicente, J., On the use of magnetic nano and microparticles for lake restoration, J. Hazard. Mater., 181, 375-81 (2010); Yuan, P., Liu, D., Fan, M., Yang, D, Zhu, R, Ge, F., Zhu, J. X., He, H., Removal of hexavalent chromium [Cr(VI)] from aqueous solutions by the diatomite-supported/unsupported magnetite nanoparticles, J. Hazard. Mater., 173, 614-21, (2010)), and can be used as a solute in a purification or desalination plant using osmosis due to water retention properties (Ling, M. M., Wang, K. Y., Chung, T.-S., Highly water-soluble magnetic nanoparticles as novel draw solutes in forward osmosis for water reuse, Ind. Eng. Chem. Res., 49, 5869-76 (2010)).

The magnetite nanoparticles having the above-mentioned properties can be prepared by various methods such as coprecipitation, thermal decomposition, micro-emulsion, hydrothermal synthesis, etc. (Lu, An-Hui, Salabas, E. L., Sch, Ferdi, Magnetic nanoparticles: Synthesis, protection, functionalization, and application, Angew. Chem. Int. Ed., 46, 1222-44 (2007)). Among them, according to the coprecipitation, the magnetite nanoparticles are prepared by dissolving an iron salt in water and allowing the solution to react at a relatively low temperature and at atmospheric pressure for several tens of minutes. Therefore, the coprecipitation is economic and suitable for mass production. Researchers have extensively studied various methods for preparing magnetite nanoparticles using the coprecipitation and, as an example thereof, a method for preparing a nanofluid, in which magnetite nanoparticles are prepared by coprecipitation and stably dispersed in a dispersion medium, has been developed (U.S. Pat. No. 3,843,540; Massart, R., Preparation of aqueous magnetic liquids in alkaline and acidic media, IEEE Trans. Magnetics MAG-17 (2), 1247-8 (1981)). Recently, Iwasaki et al. have developed a method for preparing magnetite nanoparticles at room temperature using various iron salts by coprecipitation (Iwasaki, T., Mizutani, N., Watano, S., Yanagida, T., Kawai, T., Size control of magnetite nanoparticles by organic solvent-free chemical coprecipitation at room temperature, J. Exp. Nanosci., 5, 25162 (2010)). Moreover, Korean Patent No. 10-442541 discloses a method for preparing magnetite nanoparticles using a ferrous sulfate salt by precipitation with multiple steps.

Commercially available high-purity iron salts such as $FeCl_2$, $FeCl_3$, $Fe(CH_3COO)_2$, $Fe(CO)_5$, etc. have been used as starting materials in the preparation of magnetite nanoparticles in the conventional methods including the above-mentioned literatures. However, the high-purity iron salts are expensive, which is problematic.

Even if the expensive high-purity raw materials are used in industrial fields such as magnetic resonance imaging (MRI) contrast agents, catalysts, dust-proof seals, etc., the added value of the final product is high, which can sustain economic feasibility. However, in industrial fields such as wastewater treatment or desalination plants, the economic feasibility can be achieved when the cost of the raw materials is reduced. Moreover, in the industrial fields such as wastewater treatment or desalination plants, the amount of water to be treated is significant, and thus the demand for magnetite nanoparticles is significant. Therefore, in order to apply the magnetite nanoparticles in the industrial fields such as wastewater or desalination plants, it is necessary to develop a plan to reduce the cost of magnetite nanoparticles.

In order to solve the above-described problems, many researchers have extensively studied various methods for preparing high-purity iron salts from low-grade ores. As an example thereof, Korean Patent No. 10-905403 and U.S. Pat. No. 7,550,618 disclose a preparation of iron (II) acetate powder from low-grade magnetite. However, the process of preparing a nano-material by synthesizing a high-purity iron salt such as iron (II) acetate, iron chloride, etc. from low-grade iron ore and using the iron salt as a starting material is complex and costly.

Moreover, Korean Patent No. 10-1109682 discloses a method for preparing magnetite nanoparticles from low-grade iron ore. According to this method, magnetite nanoparticles were prepared from precipitated iron hydroxide obtained by removing impurities contained in iron ore leachate by polymer adsorption or coprecipitation without preparing high-purity iron salts such as iron acetate, etc. However, this method involves high processing costs due to a process of inducing precipitation by adding an alkaline neutralizing agent, a process of redissolving iron hydroxide with a strong acid, etc. Moreover, the nanoparticles prepared by this method have a purity lower than that of a sample prepared using a commercially available high-purity reagent, which causes deterioration of material properties such as magnetic properties, and thus cannot be used as materials for high-tech products that require a purity of more than 99%.

Therefore, it is necessary to provide a simplified process which can prepare magnetite nanoparticles directly from an inexpensive starting material without intermediate steps such as the synthesis of an iron salt or the precipitation of iron hydroxides, etc.

SUMMARY OF THE INVENTION

The inventors of the present invention have studied a method for preparing magnetite nanoparticles directly from low-grade iron ore and found that the use of solvent extraction could eliminate unnecessary steps and prepare magnetite more economically, thereby completing the present invention.

Therefore, the present invention provides a method for preparing magnetite nanoparticles from low-grade iron ore using solvent extraction and magnetite nanoparticles prepared by the same.

An object of the present invention is to provide a method for preparing magnetite nanoparticles from low-grade iron ore, comprising:

(1) adding iron ore powder to an acidic solution and stirring the mixture to obtain iron ore leachate;

(2) centrifuging the iron ore leachate and separating and discharging residual powder to obtain a supernatant;

(3) adding an oxidant to the supernatant to oxidize all $Fe^{2+}$ ions to $Fe^{3+}$ ions, adding a solvent extractant thereto to form an iron-solvent extractant complex, separating the iron-solvent extractant complex from the solution, and adding distilled water to the separated iron-solvent extractant complex to obtain an aqueous solution containing $Fe^{3+}$ ions;

(4) preparing an aqueous solution containing $Fe^{2+}$ ions by adding a reducing agent to a volume of one-third to one-half of the aqueous solution containing $Fe^{3+}$ ions obtained in step (3) such that $Fe^{3+}$ ions are reduced to $Fe^{2+}$ ions, and preparing an iron salt mixed solution by adding the aqueous solution containing $Fe^{2+}$ ions to the remaining aqueous solution containing $Fe^{3+}$ ions; and (5) adding the iron salt mixed solution to an alkaline aqueous solution to prepare magnetite nanoparticles.

Moreover, another object of the present invention is to provide magnetite nanoparticles prepared by the above-described method.

Hereinafter, the present invention will be described in detail.

The method for preparing magnetite nanoparticles from low-grade iron ore according to the present invention will be described in more detail step by step as follows.

Step (1) is to obtain iron ore leachate as follows. First, after low-grade raw iron ore is crushed, iron ore powder less than 149 microns is sieved through a No. 100 sieve. The sieved iron ore powder is added to an acidic solution and stirred at 90 to 110° C. for 1 to 3 hours, thereby obtaining iron ore leachate.

The low-grade iron ore contains 30 to 70 wt % of iron.

Preferably, the acidic solution may be, but not limited to, a hydrochloric acid solution or a sulfuric acid solution.

Step (2) is to remove residual undissolved powder, in which the iron ore leachate is centrifuged, and the residual undissolved powder is separated and discharged, thereby obtaining a supernatant.

Step (3) is to extract $Fe^{3+}$ ions by solvent extraction, in which an oxidant is added to the supernatant obtained in step (2) to oxidize all $Fe^{2+}$ ions to $Fe^{3+}$ ions, the aqueous solution containing $Fe^{3+}$ ions is placed in a separating funnel, and a solvent extractant is added thereto, thus separating an organic phase and an aqueous phase. Then, the separated organic solution is centrifuged to remove silica components, thereby obtaining an organic solution containing an iron-solvent extractant complex. Distilled water is mixed with the organic solution containing the iron-solvent extractant complex, and the mixed solution is placed in a separating funnel for phase separation, thereby obtaining an aqueous solution containing $Fe^{3+}$ ions.

The oxidant may preferably be $H_2O_2$, but not limited thereto.

The iron-solvent extractant may preferably comprise an extractant, a modifier, and a diluent, but not limited thereto.

The modifier may be 2-ethyl-1-hexanol, and the diluent may be kerosene, but not limited thereto.

The extractant may be one selected from the group consisting of phosphate ester, phosphone ester, phosphine oxide, phosphine sulfide, primary amine, secondary amine, tertiary amine, and quaternary amine, but not limited thereto. Preferably, the extractant may be one selected from the group consisting of tri-butyl-phosphate (TBP), di-butyl butyl phosphate (DBBP), tri-octyl phosphine oxide (TOPO), tri-isobutyl phosphine sulfide (TIBPS), and tri-octyl amine (TOA), but not limited thereto.

Step (4) is to prepare a mixed iron salt solution containing $Fe^{2+}$ ions and $Fe^{3+}$ ions as follows. An aqueous solution containing $Fe^{2+}$ ions is prepared by adding a reducing agent to a volume of one-third to one-half of the aqueous solution containing $Fe^{3+}$ ions obtained in step (3) such that $Fe^{3+}$ ions are reduced to $Fe^{2+}$ ions, and the aqueous solution containing $Fe^{2+}$ ions is added to the remaining aqueous solution containing $Fe^{3+}$ ions, thereby preparing the iron salt mixed solution.

The reducing agent may include, but not limited to, $NaBH_4$ or $LiBH_4$.

Step (5) is to prepare magnetite nanoparticles as follows. The mixed iron salt solution containing $Fe^{2+}$ ions and $Fe^{3+}$ ions prepared in step (4) is added to an alkaline aqueous solution, and the resulting mixture is allowed to react at 30 to 50° C. for 5 to 20 minutes, thereby preparing the magnetite nanoparticles. The thus prepared magnetite nanoparticles are separated from water using a magnet and washed with distilled water.

The alkaline aqueous solution used in each step may include, but not limited to, NaOH aqueous solution, KOH aqueous solution, $Ca(OH)_2$ aqueous solution, $NH_4OH$ aqueous solution, etc.

In the magnetite nanoparticles prepared by the above-described method, the Fe content is higher than that in the raw iron ore powder, and the contents of Si and Mg that inhibit the formation of magnetite nanoparticles are significantly reduced. Typically, when the Mg is present in excess of 23 wt %, it inhibits the formation of magnetite nanoparticles. The magnetite nanoparticles prepared by the above-described method contains 95 to 99.9 wt % of Fe, 0.1 to 0.5 wt % of Si, and 0.01 to 0.1 wt % of Mg. The magnetite nanoparticles have high magnetization (i.e., magnetic moment per unit volume) and a coercive force of 0, and thus the magnetite nanoparticles can be easily recovered from water treatment plants, etc. and reused.

Moreover, the solvent extractant used in this process is expensive but can be used many dozens of times, thereby significantly reducing material costs. Further, the final extraction residue (raffinate) is an aqueous solution in which a large amount of $Mg^{2+}$ ions and a small amount of $Al^{3+}$ ions are dissolved and thus can be separately used as a material for water purification that removes phosphorus component contained in sewage.

As such, according to the method for preparing magnetite nanoparticles from low-grade iron ore of the present invention, it is possible to prepare high-purity magnetite nanoparticles having a purity of 99% or higher by solvent extraction using low-grade iron ore as a starting material, and thus it is possible to reduce the processing cost and the amount of energy used, thus supplying a high-efficiency magnetite nanoparticle adsorbent, which can be industrially applied to wastewater treatment or desalination plant, in large quantities at low cost. In particular, it is possible to effectively treat livestock wastewater, heavy metal wastewater, oil discharged into rivers, etc. at low cost, thus greatly contributing to the prevention of environmental pollution. Moreover, the magnetite nanoparticles prepared by the present invention has a purity of 99.5% and thus can be used as raw materials for high-tech products such as nanoparticle catalysts, magnetic fluids, MRI contrast agents, etc.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
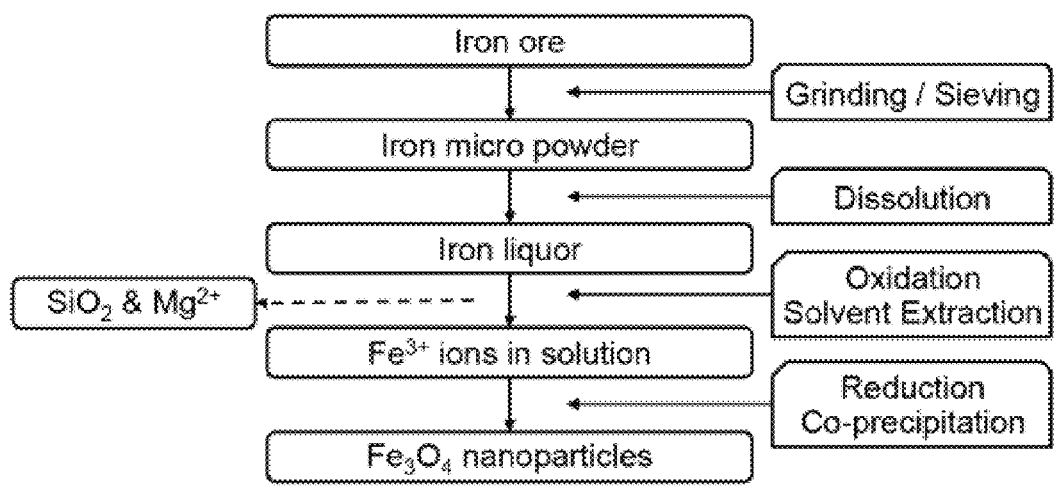
FIG. 1 is a schematic diagram showing a process of preparing magnetite nanoparticles from low-grade iron ore in accordance with the present invention.

Hereinafter, preferred examples are provided for a better understanding of the present invention. However, the following examples are not intended to limit the scope of the invention.

EXAMPLE 1

Preparation of Magnetite Nanoparticles from Low-Grade Iron Ore

After crushing magnetite iron ore, magnetite powder less than 149 microns was sieved through a No. 100 sieve. To obtain magnetite leachate, 300 g of magnetite powder and 450 mL of 11.5 M hydrochloric acid were placed in a 1 L beaker and stirred at 100° C. for 2 hours. The obtained leachate was centrifuged at 10,000 rpm for 10 minutes to separate and discharge residual undissolved powder. To 300 mL of the obtained supernatant was added 390 mL of 30% $H_2O_2$ as an oxidant such that all $Fe^{2+}$ ions were oxidized to $Fe^{3+}$ ions, and 810 mL of distilled water was added to prepare a diluted aqueous solution in which the concentration of $Fe^{3+}$ ions was 0.75 M. Then, a high-purity iron aqueous solution was obtained by selectively removing $Fe^{3+}$ ions from the leachate, in which various metal ions were dissolved, using solvent extraction. In order to selectively extract the $Fe^{3+}$ ions from the leachate, 250 mL of leachate (i.e., an aqueous solution) and 250 mL of solvent extractant (i.e., a solution in which 170 mL of tri-butyl-phosphate (TBP), 50 mL of 2-ethyl-1-hexanol, and 30 mL of kerosene were mixed together) containing 2.5 M TBP were placed in a separating funnel, uniformly mixed with a stirrer for 10 minutes, and then left for 10 minutes until an organic phase and an aqueous phase were separated from each other. At this time, silica particles that were not dissolved in a strong acid but dispersed in a colloidal state in the leachate were bonded with an organic solvent to form a semi-transparent milky emulsion in an organic solution phase separated to the top of the separating funnel. The aqueous solution and the organic solution were separated from each other by opening the tap of the separating funnel. The organic solution in which the emulsion was suspended was centrifuged at 10,000 rpm for 10 minutes to separate and remove the silica particles, thus obtaining an organic solution containing an iron-solvent extractant complex. Subsequently, as a stripping process, which is the final step of the solvent extraction, 500 mL of distilled water was mixed with 250 mL of organic phase containing the complex such that the volume ratio of the organic solution to the aqueous solution was 1:2. The mixed solution was placed in a separating funnel, vigorously stirred for 10 minutes, and then left for 10 minutes until phase separation occurred. Then, the tap was opened to separate the aqueous solution, thus obtaining a high-purity iron aqueous solution containing more than 99% $Fe^{3+}$ ions.

In order to prepare magnetite nanoparticles from the iron aqueous solution by coprecipitation, a $Fe^{2+}$ aqueous solution was prepared by reducing one-third of the high-purity $Fe^{3+}$ solution. For this purpose, 50 mL of 0.033 wt % $NaBH_4$ aqueous solution was added to 167 mL of $Fe^{3+}$ aqueous solution corresponding a volume of one-third of 500 mL of $Fe^{3+}$ aqueous solution and stirred for 10 minutes. 100 mL of iron aqueous solution in which 53 mL of $Fe^{3+}$ aqueous solution, 35 mL of $Fe^{2+}$ aqueous solution, and 12 mL of distilled water were mixed together was slowly added to 100 mL of 2.0 M NaOH alkaline aqueous solution, and the mixed solution was stirred at 40° C. for 10 minutes to react with each other, thus generating magnetite nanoparticles. Then, the nanoparticles were separated from water by a magnet and washed with distilled water three times.

The process of preparing magnetite nanoparticles from low-grade iron ore according to the present invention is shown in FIG. 1.

EXPERIMENTAL EXAMPLE 1

Wet Chemical Analysis and Inductively Coupled Plasma Atomic Emission Spectrometry (ICP-AES)

The compositions of the magnetite nanoparticles prepared in Example 1 and the raw iron ore powder were measured by wet chemical analysis and inductively coupled plasma-atomic emission spectrometry (ICP-AES, Jobin-Yvon, JY 38 plus, France), and the results are shown in Table 1.

TABLE 1

| | Concentration of elements (wt %) | | |
|---|---|---|---|
| | Raw iron ore | Magnetite nanoparticles | |
| Composition | powder | Reagent | Solution obtained from iron ore |
| Fe | 76.85 | 99.17 | 99.49 |
| Si | 7.26 | 0.29 | 0.18 |
| Mg | 11.49 | 0.03 | 0.02 |
| Al | 1.39 | 0.18 | 0.20 |
| Ca | 1.63 | 0.07 | 0.10 |
| Mn | 1.18 | 0.26 | 0.00 |
| Zn | 1.11 | 0.00 | 0.00 |
| P | 0.01 | <0.0006 | <0.0006 |
| Ti | 0.08 | 0.00 | 0.00 |
| Total | 100.00 | 100.00 | 100.00 |

Among the major metal components, the weight ratio of Fe increased from 76.9% in the raw iron ore to 99.5% in the sample of Example 1, which is the same level as 99.2% in nanoparticles prepared from commercially available iron salts. The contents of Si and Mg that inhibit the formation of magnetite nanoparticles were 7.26 wt % and 11.49 wt % in the raw iron ore and significantly reduced to 0.18 wt % and 0.02 wt % in the magnetite nanoparticles. When the $SiO_2$ component is present in an amount of 10.0 wt % or higher in a reaction solution, or when the Si component is present in an amount of 4.7 wt % or higher in a reaction solution, the magnetite nanoparticles are not formed. When the Mg is present in excess of 23.1 wt % in the reaction solution, it inhibits the formation of magnetite nanoparticles. Impurities such as Al, Ca, Mn, etc. contained in the raw iron ore in amounts of several wt % do not affect the formation of nanoparticles.

EXPERIMENTAL EXAMPLE 2

Transmission Electron Microscope

Figure 2:
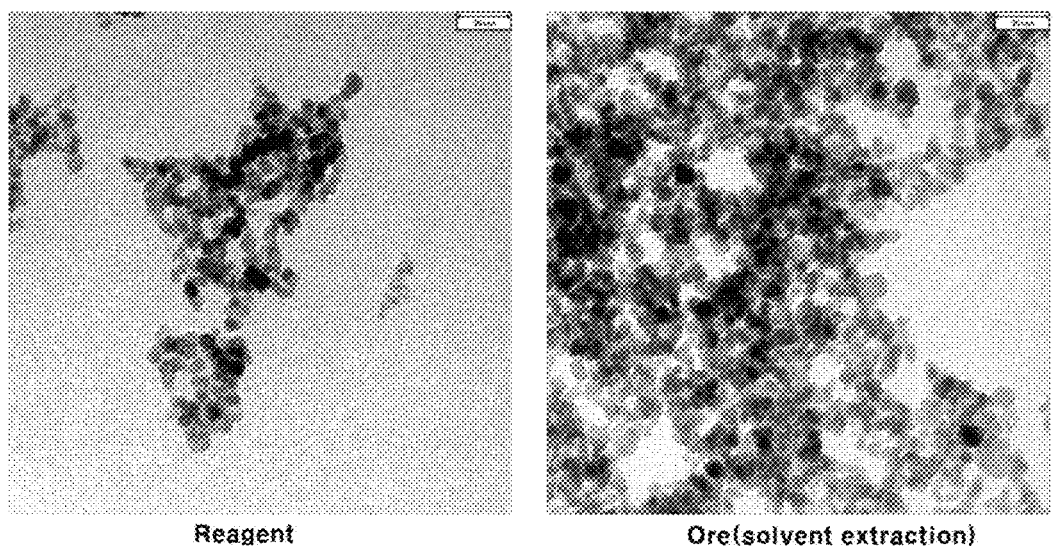
FIG. 2 shows transmission electron microscope (TEM) images of magnetite nanoparticles according to the present invention.

Images of magnetite nanoparticles prepared using low-grade iron ore according to the present invention and using a commercially available reagent, taken by a transmission electron microscope (Philips, CM12, Netherlands), are shown in FIG. 2.

As shown in FIG. 2, it can be seen that the shape of the magnetite nanoparticles prepared using the commercially available reagent is substantially the same as the nanoparticles prepared in Example 1 and that the average sizes are 11.0 nm and 10.8 nm, respectively, which are almost the same.

EXPERIMENTAL EXAMPLE 3

X-Ray Diffraction

Figure 3:
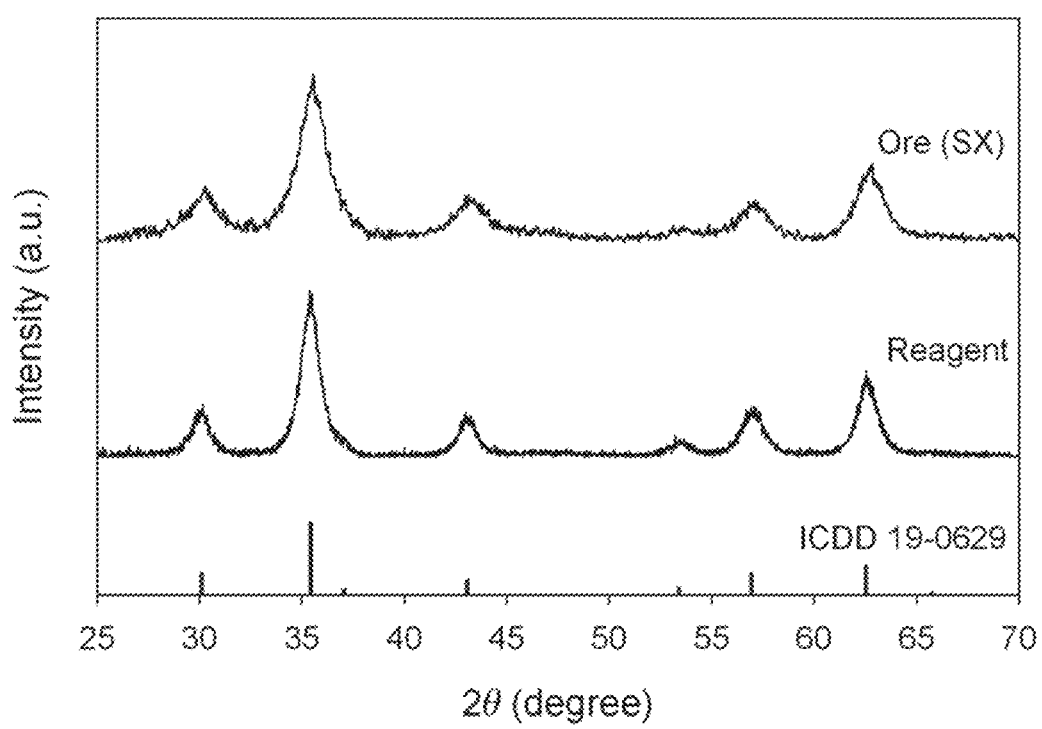
FIG. 3 shows X-ray diffraction patterns of magnetite nanoparticles according to the present invention.

XRD patterns of magnetite nanoparticles prepared using low-grade iron ore according to the present invention and using a commercially available reagent, obtained by X-ray diffraction (XRD, Rigaku, Denki Co., Model SA-HF3, Japan), are shown in FIG. 3.

As shown in FIG. 3, it can be seen that the nanoparticles prepared using the commercially available reagent and the nanoparticles prepared in Example 1 exhibit the same pattern as magnetite ICDD Card No. 19-0629, thus confirming the presence of magnetite.

EXPERIMENTAL EXAMPLE 4

Magnetic Property Measurement System

Figure 4:
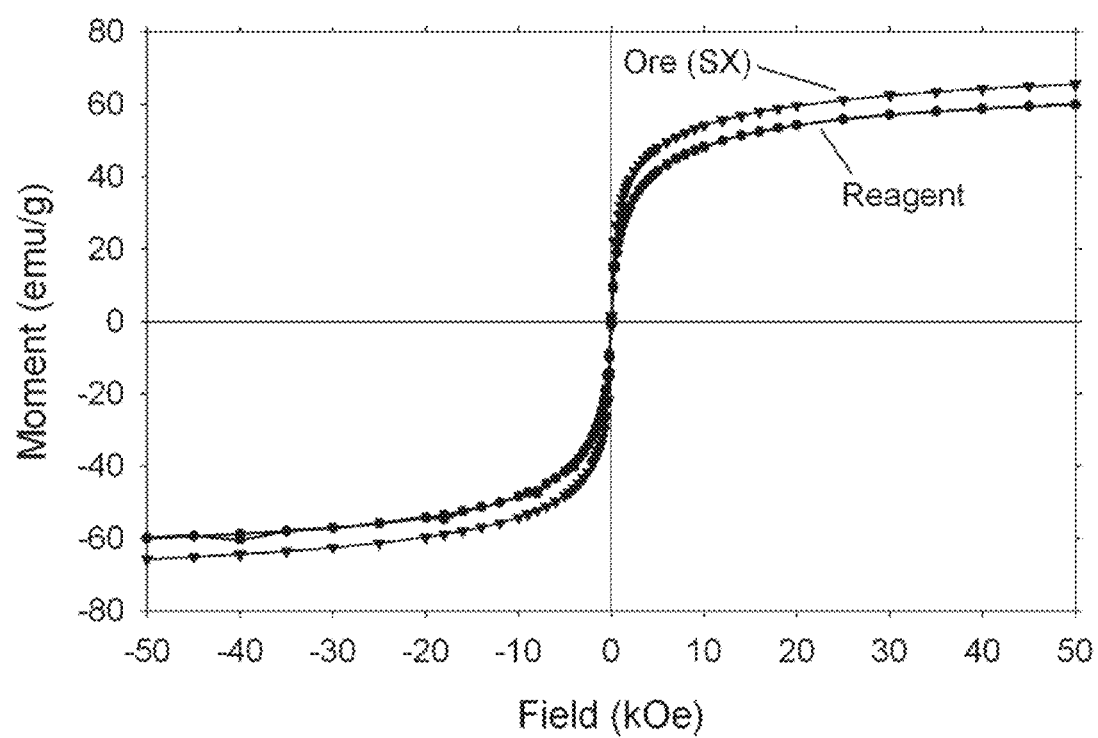
FIG. 4 shows magnetization curves of magnetite nanoparticles according to the present invention.

Magnetic hysteresis curves of magnetite nanoparticles prepared using low-grade iron ore according to the present invention and using a commercially available reagent, measured by a magnetic property measurement system (Quantum Design, MPMS 5T, USA), are shown in FIG. 4.

As shown in FIG. 4, the saturated magnetization value of the nanoparticles prepared in Example 1 is 65.6 emu/g, which is slightly higher than 60.0 emu/g of the nanoparticles prepared using the commercially available reagent. Moreover, the nanoparticles prepared in Example 1 have a coercive force of 0 and thus can be effectively recovered and reused in wastewater treatment, etc. This can be understood in the same way as the fact that the nanoparticles could be easily separated from the solvent without using a separate device such as a centrifuge during the preparation of the nanoparticles in Example 1.

As described above, according to the method for magnetite nanoparticles from low-grade iron ore of the present invention, it is possible to prepare high-purity magnetite nanoparticles having a purity of 99% or higher by solvent extraction using low-grade iron ore as a starting material, and thus it is possible to reduce the processing cost and the amount of energy used, thus supplying a high-efficiency magnetite nanoparticle adsorbent, which can be industrially applied to wastewater treatment or desalination plant, in large quantities at low cost. In particular, it is possible to effectively treat livestock wastewater, heavy metal wastewater, oil discharged into rivers, etc. at low cost, thus significantly contributing to the prevention of environmental pollution. Moreover, the magnetite nanoparticles prepared by the present invention has a purity of 99.5% and thus can be used as raw materials for high-tech products such as nanoparticle catalysts, magnetic fluids, MRI contrast agents, etc.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for preparing magnetite nanoparticles from low-grade iron ore, comprising:
    (1) adding iron ore powder to an acidic solution and stirring the mixture to obtain iron ore leachate;
    (2) centrifuging the iron ore leachate and separating and discharging residual powder to obtain a supernatant;
    (3) adding an oxidant to the supernatant to oxidize all $Fe^{2+}$ ions to $Fe^{3+}$ ions, adding a solvent extractant thereto to form an iron-solvent extractant complex, separating the iron-solvent extractant complex from the solution, and adding distilled water to the separated iron-solvent extractant complex to obtain an aqueous solution containing $Fe^{3+}$ ions;
    (4) preparing an aqueous solution containing $Fe^{2+}$ ions by adding a reducing agent to a volume of one-third to one-half of the aqueous solution containing $Fe^{3+}$ ions obtained in step (3) such that $Fe^{3+}$ ions are reduced to $Fe^{2+}$ ions, and preparing an iron salt mixed solution by adding the aqueous solution containing $Fe^{2+}$ ions to the remaining aqueous solution containing $Fe^{3+}$ ions; and
    (5) adding the iron salt mixed solution to an alkaline aqueous solution to prepare magnetite nanoparticles.

2. The method of claim 1, wherein in step (1), the iron ore powder comprises 30 to 70 wt % of iron.

3. The method of claim 1, wherein in step (1), the acidic solution is a hydrochloric acid solution or a sulfuric acid solution.

4. The method of claim 1, wherein in step (1), the reaction condition for preparing iron ore leachate is at 90 to 110° C. for 1 to 3 hours.

5. The method of claim 1, wherein in step (3), the oxidant is $H_2O_2$.

6. The method of claim 1, wherein in step (3), the solvent extractant comprises at least one selected from the group consisting of an extractant, a modifier, and a diluent.

7. The method of claim 6, wherein the modifier is 2-ethyl-1-hexanol, and the diluent is kerosene.

8. The method of claim 6, wherein the extractant comprises at least one selected from the group consisting of tri-butyl-phosphate (TBP), di-butyl butyl phosphate (DBBP), tri-octyl phosphine oxide (TOPO), tri-isobutyl phosphine sulfide (TIBPS), and tri-octyl amine (TOA).

9. The method of claim 1, wherein in step (4), the reducing agent comprises $NaBH_4$ or $LiBH_4$.

10. The method of claim 1, wherein in step (5), the alkaline aqueous solution comprises at least one selected from the group consisting of NaOH aqueous solution, KOH aqueous solution, $Ca(OH)_2$ aqueous solution, and $NH_4OH$ aqueous solution.

11. The method of claim 1, wherein in step (5), the reaction condition for preparing magnetite nanoparticles is at 30 to 50° C. for 5 to 20 minutes.

12. Magnetite nanoparticles prepared by the method of claim 1 and comprising 95 to 99.9 wt % of Fe, 0.1 to 0.5 wt % of Si, and 0.01 to 0.1 wt % of Mg.

* * * * *